United States Patent [19]

Ladewski et al.

[11] Patent Number: 4,531,215
[45] Date of Patent: Jul. 23, 1985

[54] VALIDITY CHECKING ARRANGEMENT FOR EXTENDED MEMORY MAPPING OF EXTERNAL DEVICES

[75] Inventors: Chester T. Ladewski; Harry A. Chapman; Jeffrey J. Johnston, all of Phoenix, Ariz.

[73] Assignee: GTE Automatic Electric Incorporated, Northlake, Ill.

[21] Appl. No.: 506,565

[22] Filed: Jun. 22, 1983

[51] Int. Cl.³ .................................... G06F 11/00
[52] U.S. Cl. ................................. 371/67; 371/57
[58] Field of Search ............... 371/57, 67, 68, 69, 371/70

[56] References Cited

U.S. PATENT DOCUMENTS

| | | | |
|---|---|---|---|
| 3,449,717 | 6/1969 | Smith et al. | 371/70 |
| 3,737,577 | 6/1973 | Birkin | 371/69 |
| 3,781,792 | 12/1973 | Birkin | 371/69 |
| 3,978,449 | 8/1976 | Sanders et al. | 371/70 |
| 4,138,599 | 2/1979 | Munter | 371/67 |
| 4,155,073 | 5/1979 | Ulch et al. | 371/67 |

Primary Examiner—Jerry Smith
Assistant Examiner—Michael R. Fleming
Attorney, Agent, or Firm—Frank J. Bogacz; Peter Xiarhos

[57] ABSTRACT

In a telecommunications switching system, a CPU utilizes memory mapped access to a number of duplex external devices and other memories. A validity checking arrangement provides for detecting invalid external device unit numbers for memory mapped accesses by the CPU. In addition, this validity checking arrangement will determine that the CPU's operating software has attempted a memory mapped access with an invalid unit number or that a true hardware fault exists.

6 Claims, 4 Drawing Figures

VALIDITY CHECKING ARRANGEMENT FOR EXTENDED MEMORY MAPPING OF EXTERNAL DEVICES

BACKGROUND OF THE INVENTION

The present invention pertains to a telecommunications central processor unit (CPU) access to external devices and more particularly to an arrangement for determining CPU accesses to invalid external devices by the CPU's operating software and distinguishing these invalid accesses from true hardware faults.

In telecommunications switching systems, there is generally extensive duplication of equipment, due to the public policy of providing uninterrupted communications services. These switching systems are typically controlled by one or more CPUs. Many modern CPUs provide multiple unit selection via extended memory mapping. These CPUs provide no hardware or software isolation, when invalid external devices are accessed via memory mapping.

Pure software isolation methods for invalid external device selection include, table lookups procedures. When a malfunction is detected, the unit number is examined against all possible valid unit numbers. This consumes much CPU real time. Also, it is wasteful of memory because a table of valid unit numbers must be stored to compare against the suspect invalid unit number.

In another solution, Read Only Memory (ROM) may be utilized. However, any addition of external devices to the system necessitates changing to a new ROM. This is inefficient and expensive.

Accordingly, it is the object of the present invention to provide a validity checking arrangement for extended memory mapping of external devices which is memory size efficient, easily changeable and quick operating in terms of real time.

SUMMARY OF THE INVENTION

In a telecommunications switching system, a CPU accesses a plurality of external devices by a memory mapped access. A validity checking arrangement is provided for determining whether the accesses from the CPU are directed at any invalid external devices.

The validity checking arrangement includes a changeable memory connected to the CPU for dynamically storing memory words representing an access status for each of a possible number of external devices. The total number of access status devices may contain both valid and invalid ones. For valid external devices, the access status word corresponding to the external device includes matching word halves. For invalid external devices, the access status word includes word halves which are non-matching and form a particular predefined value.

When a CPU accesses an external device, it generates a unit number signal which represents the particular device that is to be accessed. In response to this unit number signal, the memory reads out and transmits a particular selected access status word.

Comparing circuitry is connected to the memory and the CPU. The comparing circuitry operates in response to the one selected access status word, to provide an alarm signal for miscomparison of the two halves of the selected access status word. This condition would indicate that an invalid unit signal is transmitted by the CPU. If the two halves of the selected access status word are equal, the comparing circuitry will transmit one-half of the selected access status word for further processing.

DESCRIPTION OF THE PREFERRED EMBODIMENT

In modern telecommunications switching systems, CPUs include circuitry to extend its memory access to include additional memory and external devices. For reliability purposes in telecommunications switching systems, the memory and external devices are duplicated. In order to control the configuration and selection of these duplicated external devices and memory, a memory mapping of the CPU's address space is utilized in the present invention to permit access to the various external devices. For example, an INTEL 8086 CPU is able to access 16 groupings termed pages via a memory type access. INTEL is a registered trademark of INTEL Corporation. In the present invention, pages 13 and 14 of the data space are dedicated to provide extended memory access to external devices.

There may be a number of such external devices connected to the CPU. In addition to selecting the appropriate page of the data space, a CPU must also provide an indication of which particular external device is to be selected. This is accomplished in the present invention by transmitting a signal termed a unit number. The present unit number is 8 bits in width, thereby providing for up to 256 unique units. Not all of the 256 unit numbers are implemented by having corresponding external devices. That is, there may be a number of invalid numbers among the group of 256 unit numbers.

Figure 1:
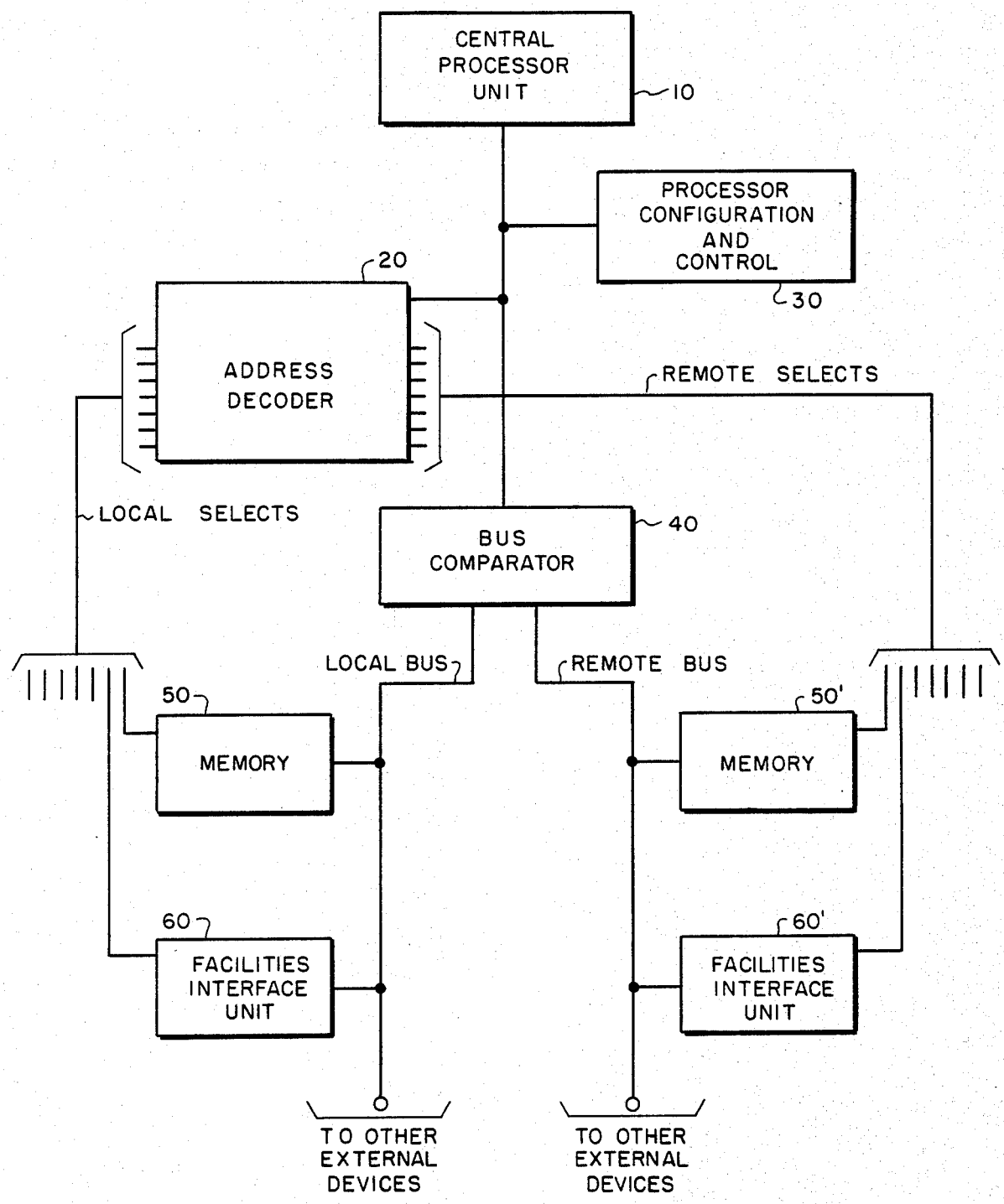
FIG. 1 is a block diagram of a CPU arrangement of a telecommunications switching system.

Referring to FIG. 1, the central processing unit architecture embodying the present invention is shown. A simplex configuration of the central processing unit and associated devices is shown although, duplex central processing units and associated devices are used for reliability purposes. Central processing unit (CPU) 10 is shown connected to address decoder 20 and processor configuration and control 30. Address decoder 20 provides for the selection process of external devices. That is, address decoder 20 initiates an access of an external device and processes a ready signal from an external device when it has completed its assigned task. Processor configuration and control 30 maintains and selects proper configuration of the CPUs and its associated devices.

Bus comparator 40 is connected to CPU 10 and provides for comparing the local and remote bus copies for maintaining system integrity. External devices such as memories 50 and 50', facility interface units 60 and 60' and other external devices may be selected by the central processing units. As a result, a unit number signal is transmitted from the CPU 10 via the local and (or) the remote buses (depending on whether the access is a simplex or a duplex one) to the external devices. Since CPU 10 employs a memory mapping access for external devices, each external device will respond with a ready signal when it has completed its assigned task. This ready signal will be transmitted to the CPU 10 via the local and remote select leads via address decoder 20.

Since the external devices and memory are duplicated, a variety of accesses may be performed. For these duplicated external devices, the following terminology is employed. One copy of the duplex device is termed a local unit and the other copy of the duplex device is termed a remote unit. These terms are just for reference and do not denote the physical location of the units with respect to the CPU. Access may be made to both units simultaneously (duplex), to one unit only (simplex), to the other unit of the pair, or to update one or the other unit of the pair.

To implement this configuration control scheme between the duplicated pairs of external units, a RAM memory is employed to contain information pertinent to the configuration for each valid unit number. This information is called a configuration control byte (CCB) and is stored in the random access memory. Table 1 gives the kind of accesses and the values for each access.

TABLE 1

| ACCESS | ACTIVE UNIT (Of Pair) | CCB VALUE |
| --- | --- | --- |
| Simplex | Local | 6262 (H) |
| Duplex | Local | 7E7E (H) |
| Simplex Update | Local | 7272 (H) |
| Simplex | Remote | 1818 (H) |
| Duplex | Remote | 7C7C (H) |
| Simplex Update | Remote | 5858 (H) |

The CCB values of the table are shown in hexidecimal, as indicated by (H). As can be seen from Table 1, the CCB values for the upper and lower bytes of the word are identical.

Figure 2:
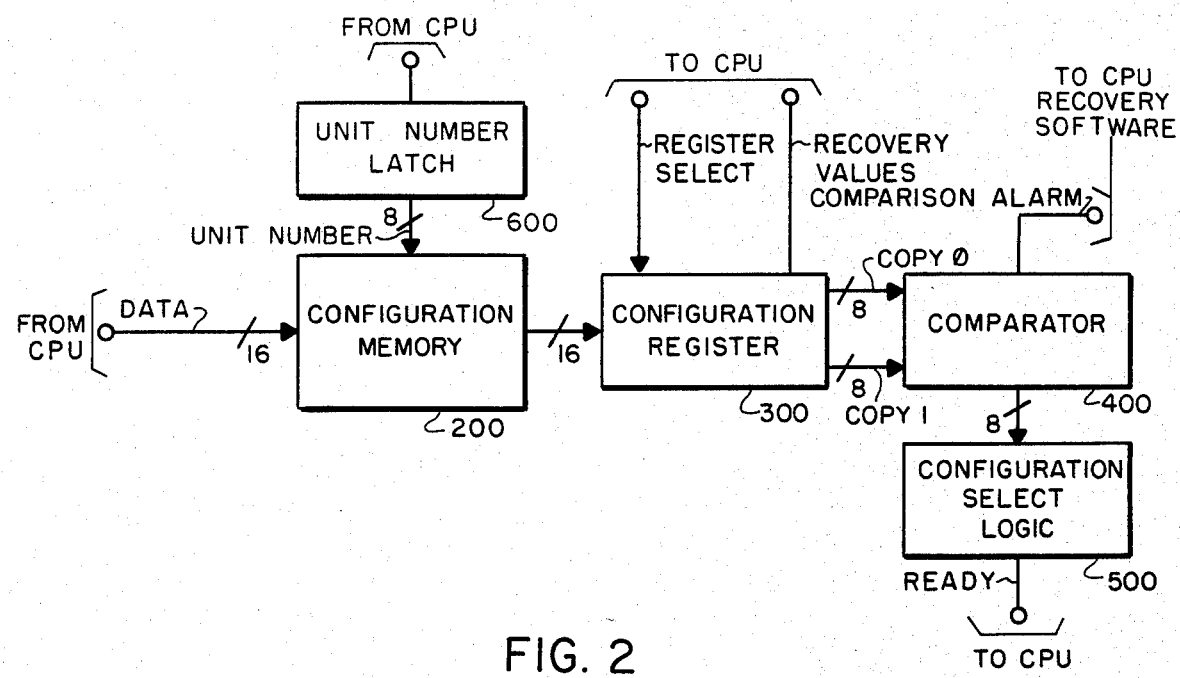
FIG. 2 is a block diagram of circuit apparatus for validity checking of extended memory mapped CPU access of external devices.

Referring to FIG. 2 when the telecommunications switching system initially starts up, the CPU will write each 16-bit location of the random access configuration memory 200 with a value of 5A25 (H) via the 16-bit data bus. As the switching system is further initialized, the CPU will initialize all 16-bit locations in configuration memory 200 with CCB values, in accordance with Table 1, for each valid unit number. Each unit number (0 through 255) corresponds to one location in the configuration memory 200. This is called the configuration control byte (CCB) and is duplicated in the 16 bits of each location. Therefore, at this time, there will be a number of locations in configuration memory 200 which contain the invalid CCB 5A25 (H).

When the CPU requires an extended memory access to an external device, the CPU transmits the unit number to configuration memory 200 via unit number latch 600. The appropriate CCB is read from memory 200 as a function of the unit number. The duplicated CCB is then transmitted via a 16-bit bus to configuration register 300. As mentioned above, when the INTEL 8086 CPU of the present invention requires access to an external device via this memory mapping scheme, pages 13 or 14 will be selected. As a result, the register select signal is transmitted to configuration register 300. In response to the register select signal, the 16-bit word is then divided into two 8-bit halves or bytes. These two bytes are then transmitted to comparator 400. One byte being transmitted on the copy 0 bus and one byte being transmitted on the copy 1 bus.

Comparator 400 provides for performing a bit-for-bit comparison between the contents of copy 0 bus and the contents of copy 1 bus. As can be seen from Table 1, the CCB values for valid kinds of accesses have identical information stored in the duplicated CCB bytes stored in the configuration memory 200. For a successful comparison by comparator 400, one copy of the configuration control byte (CCB) will be transmitted to configuration select logic 500. This will enable appropriate selection of the devices in accordance with the CPU request. A ready signal will also be returned to the CPU.

For an invalid unit number, copy 0 and copy 1 bytes of the CCB will not compare. This will result in a comparison alarm signal being generated to the CPU, which will cause a non-maskable interrupt. This non-maskable interrupt will result in the execution of the recovery software. Therefore, it is determined that either an invalid unit number was utilized in the external device access or that some valid hardware fault exists.

Figure 3:
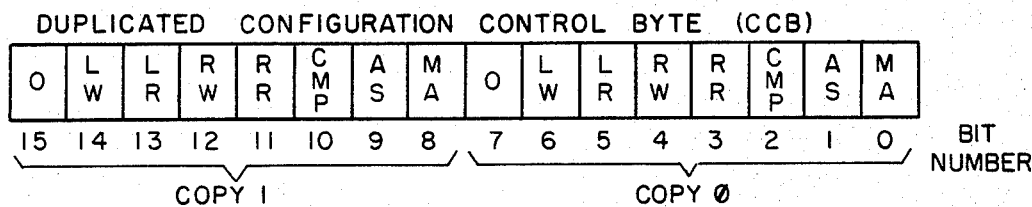
FIG. 3 is a bit format of a duplicated configuration control byte of the present invention.

Referring to FIG. 3, the memory layout of a duplicated configuration control byte (CCB) is shown. Bits 0 through 7 of the 16-bit word comprise copy 0 of the CCB and bits 8 through 15 comprise copy 1. These bits indicate the kind of access being performed: LW=Local Write; LR=Local Read; RW=Remote Write; RR=Remote Read; CMP=Comparison; AS=Active Status; and MA=Maintenance Access.

Figure 4:
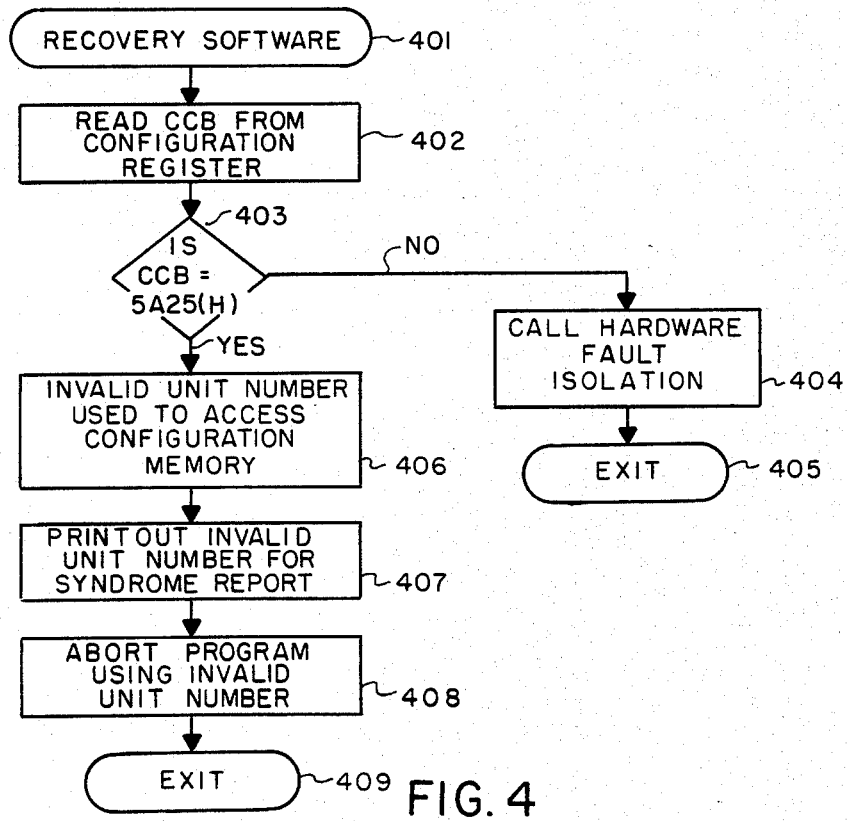
FIG. 4 is a flow chart of the recovery program of the present invention.

Referring to FIG. 4, a flow chart of the recovery software is shown. The recovery software 401 is entered as a result of the miscomparison and the generation of non-maskable interrupt as mentioned above. First, the recovery software will read the CCB values from configuration register 300 via the recovery values lead as indicated by block 402. Next, a decision (block 403) will be made to determine whether the value of the CCB is equal to 5A25 (H). If the answer to this question is "no," a call will be made to hardware fault isolation block 404. It is known that the problem is a hardware fault and not an invalid unit number generated by the software of the CPU. Then, the program will be exited block 405.

If the CCB did equal 5A25 (H) a "yes" answer to decision 403, then an invalid unit number was used to access the configuration memory by the CPU operating program block 406.

Next, a syndrome report will be printed on an I/O terminal to aid the user in program debugging, block 407. The operating program that used the invalid unit number will have its execution aborted, block 408, since no valid data can be sent or received from an invalid unit. The program will then exit, block 409.

Although the preferred embodiment of the invention has been illustrated, and that form described in detail, it will be readily apparent to those skilled in the art that various modifications may be made therein without departing from the spirit of the invention or from the scope of the appended claims.

What is claimed is:

1. In a telecommunications switching system, a CPU accesses a plurality of external devices via a plurality of unit signals in a memory mapped access, a validity checking arrangement for determining said CPU access to invalid ones of said plurality of external devices, said validity checking arrangement comprising:

changeable memory means being connected to said CPU for dynamically storing words representing an access status for each of said plurality of external devices, said changeable memory means being operated to store said words;

said access status word including identical half words for each valid external device;

said access status word including non-identical half words of a predefined value for each invalid external device;

said changeable memory means being further operated in response to said unit signal of said CPU, representing a particular device access, to read out and to transmit one selected access status word of said plurality of status words;

means for comparing connected to said changeable memory means and to said CPU and being operated in response to said selected access status word to perform a bit-for-bit comparison and to provide an alarm signal for any bit miscomparison of said halves of aaid selected access status word, for indicating an invalid unit signal selection by said CPU;

logic means connected between said means for comparing and said CPU;

said means for comparing connected to said logic means and being further operated to transmit said one selected access status word half to said logic means in response to a bit-for-bit equality comparison of said selected access status word halves; and said logic means being operated in response to said transmitted access status half words to configure said external devices and to transmit a ready signal to said CPU.

2. A validity checking arrangement as claimed in claim 1, wherein there is further included means for initialization connected between said CPU and aaid changeable memory means, said means for initialization being operated to permit setting each access status word of said changeable memory means to a particular predetermined value.

3. A validity checking arrangement as claimed in claim 1, said means for comparing including:

register means connected to said CPU and to said changeable memory means and being operated in response to a register select signal of said CPU to transmit said selected access status word halves;

said register means further operated to transmit said access status word halves to said CPU; and binary comparator means connected between said register means and said CPU and being operated to compare said selected access word halves and said binary comparator means being further operated to transmit one selected access status word half to said CPU for said equality comparison.

4. A validity checking arrangement as claimed in claim 3, wherein there is further included means for generating connected between said binary comparator means and said CPU and being operated in response to said transmitted access status word half to produce a ready signal to CPU.

5. A validity checking arrangement as claimed in claim 3, wherein there is further included means for recovery comprising:

means responsive to binary comparator means and being operated to read said miscomparing access status word halves from said register means;

means for testing operated in response to said means responsive to compare said access status word halves to a predetermined value;

first means operated in response to a miscomparison of said access status word halves with said predefined value to detect a hardware fault; and second means being operated in response to a comparison of said access status word halves to initiate a printed report of said invalid unit number and to cancel the execution of a program using said invalid unit number.

6. A validity checking arrangement as claimed in claim 1, said changeable memory means including:

a memory unit; and latching means connected between said memory unit and said CPU and being operated to store and to forward said unit signal to said memory unit.

* * * * *